United States Patent Office 3,369,426
Patented Feb. 20, 1968

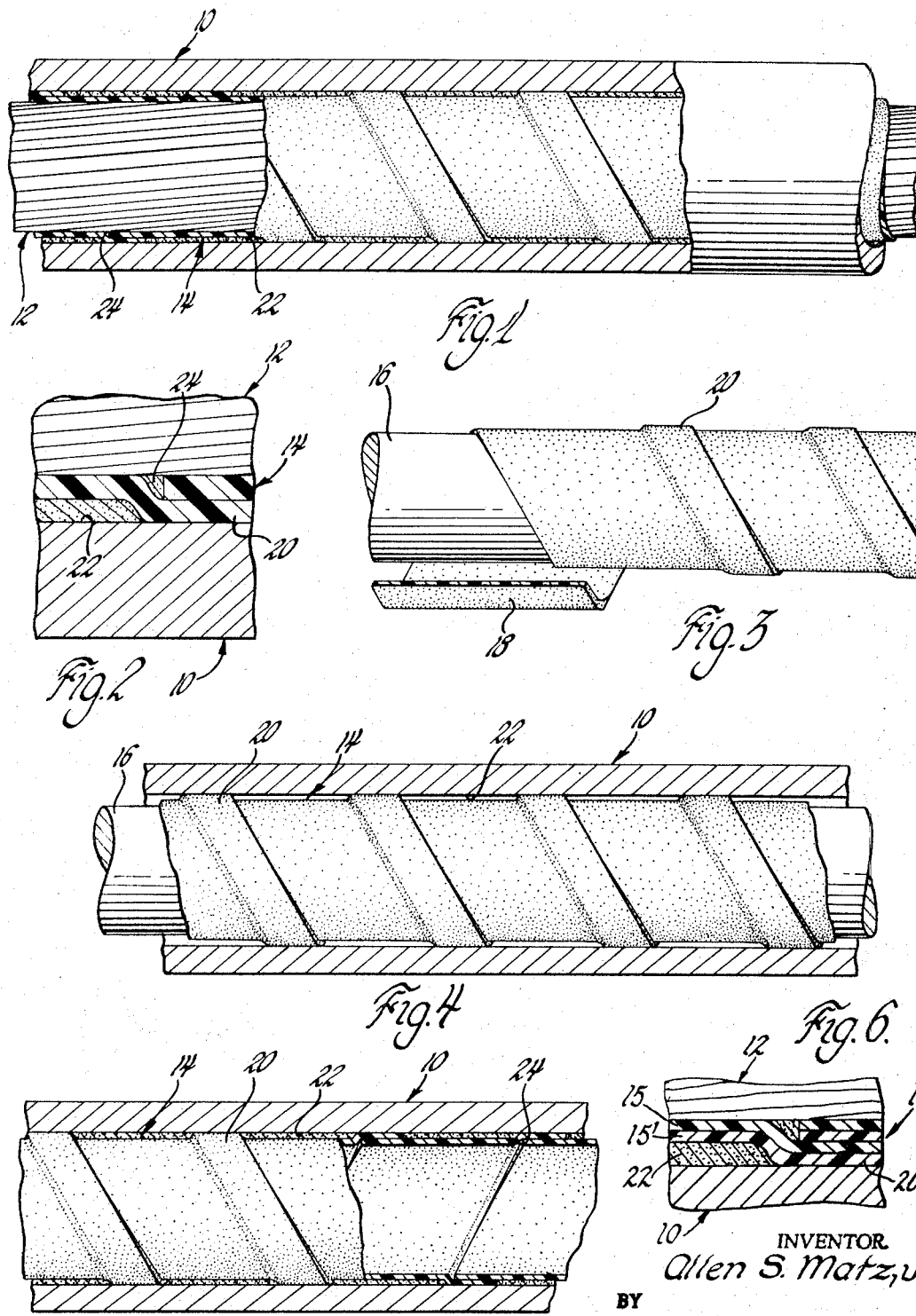

3,369,426
PLASTIC-LINED CONDUIT
Allen S. Matz, Jr., North Wales, Pa., assignor to Teleflex, Incorporated, North Wales, Pa., a corporation of Delaware
Filed Nov. 30, 1964, Ser. No. 414,815
11 Claims. (Cl. 74—501)

ABSTRACT OF THE DISCLOSURE

A plastic conduit assembly in which an inner liner is formed of a plastic material, wrapped around an aluminum mandrel in such way as to overlap a portion of the preceding wrap, thereby providing a helical ridge along the length of the liner member. The helical ridge spaces the remaining portions of the liner member away from the guide conduit, so that when bonding material is used to secure the liner in the conduit a bulk or mass of the bonding material will be disposed between the conduit and the liner. This provides additional mechanical strength for securing the liner member in the guide conduit. Additionally, by overlapping a portion of the material when wrapping, an inner helical groove is formed to provide lubricant retaining means on the inner side of the liner member.

---

This invention relates to control systems and a method of manufacture thereof, and more particularly to a control system of the type wherein an outer conduit has a control member disposed within and shiftable relative to the conduit.

In many articles of manufacturers, it is desirable to operate a remote member in some manner from a location from the member. This is generally accomplished by means of a flexible cable disposed within a guide conduit or rotatably within the guide conduit. It is the usual practice to provide an outer conduit of either rigid or flexible nature, dependent upon the article and upon the operation desired, the outer conduit having a sleeve or liner of a suitable plastic material disposed between the conduit and the inner cable. The inner cable is generally formed of a series of wires, helically wrapped to provide the necessary tensile strength. The inner sleeve member has low friction characteristics and may conveniently be formed of a material such as polytetrafluoroethylene, otherwise known as "Teflon," which has a certain degree of inherent lubricity, to at least partially eliminate the need for continuous lubrication of the cable within the guide conduit.

In the usual control system, the inner member is formed of a sleeve of plastic material disposed within and bonded to the inner surface of the outer conduit element. There are instances where additional strength in the connection between the sleeve member and the outer conduit is required, above and beyond the strength obtainable by the normal surface-to-surface bonding. Furthermore, there are instances where it is necessary to provide a lubricant for the cable for ease in movement of the cable relative to the inner liner member. It has been discovered that with normal operation of the cable within the inner liner member, and particularly with movement longitudinally of the control system, lubricant is carried with the cable and gradually works it way out of the control system at the ends of the liner member.

The construction in which this invention is embodied comprises, generally, an inner sleeve member formed with means on the outer surface of the outer conduit. The space therebetween is filled with a finite thickness of the bonding material that secures the inner member to the outer conduit, thus adding additional strength to the joint. Such additional bonding material forms a mechanical lock and in order for the joint to fail, the bonding material must be sheared. The inner sleeve member may be conveniently formed by spirally winding a tape or suitable plastic material having low friction characteristics about a mandrel, with one edge of the tape overlapping the preceding wrap. The multiple thickness at the overlapped edge provides a helical ridge along the length of the outer surface of the inner member, the parts of the liner between the wraps of the helical ridge serving as a space to receive the bonding material. As the wrap is formed, an inner helical groove is provided in the inner surface of the liner member, the groove serving as a lubricant retaining groove to prevent the cable from carrying the lubricant to the ends of the inner member.

The resulting construction is a control system which has considerable strength between the liner member and the outer conduit, preventing failure of the control system in such installations where extreme strength is required. The liner member is relatively simple to manufacture and produce, as well as to assemble and bond to the outer conduit, providing an economical and efficient control system. Lubricant retention is provided between the liner member and the cable member for added efficiency in the control system.

These and other advantages will become more apparent from the following description and drawing in which:

FIGURE 1 is a view with parts broken away and in section of the control system utilizing the outer conduit liner member and cable embodying the invention.

FIGURE 2 is an enlarged view of a portion of the structure shown in FIGURE 1 showing the result of the overlapped inner member.

FIGURE 3 is a view with parts broken away and in section showing one step in the formation of the liner member.

FIGURE 4 is a view with parts broken away and in section showing a later step in the assembly process of the control system.

FIGURE 5 is a view with parts broken away and in section illustrating the outer conduit and liner assembly prior to the insertion of the actuating cable.

FIGURE 6 is an enlarged view similar to FIGURE 2 showing a modification of the overlapped inner member.

Referring more particularly to the drawing, FIGURE 1 best illustrates the complete control assembly. An outer conduit, illustrated generally by the numeral 10, is intended to extend between the operating means and the object that is to be operated, and may be formed of any suitable material to accomplish the intended function. Conduit 10 may be rigid in its extension between the operating and operated means, or it may be flexible in order to provide the proper directional support for the control assembly. Disposed within the conduit 10 is the control cable, illustrated generally by the numeral 12, which is of a flexible nature and preferably formed of a plurality of long lay helical wires wound around a central core. Such cable assemblies are well known in the prior art, and any suitable construction may be utilized in the control system.

Disposed between the outer conduit 10 and the cable assembly 12 is a liner, illustrated generally by the numeral 14, formed of a material having low friction characteristics. The liner 14 may be formed of any of a number of materials, but it is preferred that the liner be formed of a polytetrafluoroethylene, commonly known as "Teflon," which has the required strength and formability characteristics as well as an inherent lubricity to make the material an excellent bearing means for the cable assembly 12. The liner 14, formed in a manner to be hereinafter more particularly described, is bonded to the outer conduit 10 and securely held in place therein. The cable 12 fits closely within the liner 14 and the inherent lubricity of the Teflon permits easy shifting movement of the cable. Should additional lubrication be necessary, a suitable lubricant may be introduced between the cable 12 and the liner 14, so long as the lubricant has no adverse effect on either the cable or the liner materials.

Referring next to FIGURE 3, the first step in the formation of the liner 14 is illustrated. A mandrel 16, of any suitable material and preferably of aluminum, has wound therearound a Teflon tape 18, wound in spiral fashion so that about one-quarter of the width of the tape 18 overlaps the edge of the preceding wrap. In so doing, a helical ridge 20 is formed along the outer surface of the liner 14, for purposes to become hereinafter more apparent. In the formation process, the wrapped mandrel is heated to a sufficient temperature to sinter the Teflon tape, thus bonding the overlapping edge to the preceding wrap. The material is then allowed to cool, resulting in a liner member structure, still disposed about the mandrel 16. It may be desirable, depending on the thickness of the liner desired, to use a tape of several thicknesses of material as illustrated in FIGURE 6, wherein the liner 14 is composed of two thicknesses of material 15 and 15'. Upon sintering, the layers will be bonded together, creating an integral sleeve structure.

The wrapped mandrel is then disposed within the conduit and the liner 14, any suitable bonding material being used, such as an epoxy resin. The helical ridge 20 engages the inner surface of the outer conduit 10, providing a space between the conduit and the remainder of the outer surface of the liner 14. Sufficient bonding material is disposed within the outer conduit to completely fill the spaces or pockets 22 formed between the liner 14 and the inner surface of the outer conduit 10 and between the wraps of the helical ridge 20.

With the wrapped mandrel disposed within the conduit 10, the assembly is then heated to cure the bonding material and provide a secure bond between the liner member and the outer conduit. The binder material secures the outer surface of the helical ridge 20 to the inner surface of the conduit in the usual manner, and at the same time fills the spaces or pockets 22 with a larger mass of binder material.

After the assembly has been cured and cooled to room temperature, it is necessary to remove the mandrel 16 from the liner 14. This may be done in any convenient manner, although the preferred method is to apply a tensile force to the mandrel 16, causing the mandrel to stretch and reduce its outside diameter. Once this has been accomplished, it is relatively simple to pull the mandrel 16 from the liner member 14, taking advantage also of the inherent lubricity of the Teflon, to make way for the cable structure, which is then inserted into the conduit assembly.

By forming the liner member of a wrap of plastic tape or the like, the overlap forms not only an outer helical ridge but also an inner helical groove, illustrated by the numeral 24. Groove 24 is formed in the opposite direction to the direction of the lay of the wires in the cable assembly, and thus serves as a lubricant retention groove in the inner surface of the liner 14. Should a lubricant material be necessary between the cable and the liner 14, movement of the cable longitudinally of the conduit structure, or rotatably within the conduit structure, cannot work the lubricant completely out of the conduit assembly. The groove 24 will trap and retain a certain amount of the lubricant as it is moved. Thus, the conduit assembly remains properly lubricated for optimum operation.

Thus, a conduit system is provided with extreme strength between the outer conduit and the cable itself. By forming the liner member to provide bonding material receiving space or pockets between the outer conduit and the main body of the liner member and by filling such spaces or pockets with the binder material, movement of the liner member relative to the conduit is restricted or opposed by the surface to surface bonding contact between the outer surfaces of the spacing means and the inner surface of the conduit, as well as by the body of the bonding material disposed in the spaces or pockets. Such additional bonding material not only rigidly secures the exterior surface of the main portion of the liner member to the interior surface of the outer conduit, but it provides a mechanical lock which must be sheared in order to cause the joint to fail. The manner in which the liner member is formed, that is, by helically wrapping a tape of plastic material about a mandrel, provides not only the outer helical ridge on the liner member but also provides a lubricant retaining helical groove in the inner surface of the liner member.

It will now become apparent to those having skill in the art that numerous alterations and modifications may be made in the structure after having had reference to the foregoing description and drawing. However, it is not intended to limit the invention to the foregoing description and drawing but by the scope of the appended claims in which:

I claim:

1. A guide conduit structure for a flexible cable comprising:
   an outer conduit;
   a liner member having a helical ridge along the length thereof disposed within said outer conduit to provide bearing means for a cable shiftable within the conduit structure;
   and bonding material disposed between said helical ridge and said conduit and filling the space between said liner member and said conduit adjacent said helical ridge for securing said liner member in said conduit.

2. A guide conduit structure for a flexible cable comprising:
   an outer conduit;
   a liner member disposed within and bonded to said conduit to provide bearing means for a cable shiftable within said conduit structure, said liner member having means forming spaces between said liner member and said conduit;
   and bonding material disposed between said liner member and said conduit and in said spaces between said liner member and said conduit to securely connect said liner member and said conduit.

3. A guide conduit structure for a flexible cable comprising:
   an outer conduit;
   a liner member disposed within said outer conduit, said liner member having portions along the length thereof spaced from said outer conduit to form pockets;
   and bonding material disposed between said liner member and said conduit and filling said pockets and providing bonding and additional mechanical securement of said liner member to said conduit, said liner member providing bearing means for a cable shiftable within said conduit structure.

4. A guide conduit structure for a flexible cable comprising:
   an outer conduit;
   a liner member disposed within said conduit, said liner member being formed of a spirally wound and overlapped tape, said overlap defining a helical ridge along the length of said liner member to provide pockets between said conduit and said liner member;
   and bonding material disposed between said liner member and said conduit and in said pockets to secure said liner member in said conduit.

5. The guide conduit structure set forth in claim 4 wherein said overlap on said inner member defines a helical groove in the interior surface of said liner member, said groove forming lubricant retaining means for the cable therewithin.

6. The guide conduit structure set forth in claim 4 wherein said inner member is formed of a material having low friction characteristics.

7. The guide conduit structure set forth in claim 4 wherein said inner member is formed of polytetrafluoroethylene.

8. The guide conduit structure set forth in claim 4 wherein said outer conduit is rigid.

9. A control system comprising:
an outer conduit;
a liner member disposed within said conduit, said liner member having means formed thereon for forming bonding material receiving spaces between said liner member and said conduit;
bonding material disposed between said liner member and said outer conduit and filling said spaces to secure said liner member to said conduit;
and cable means disposed within and shiftable relative to said liner member;
said liner member having lubricant retaining means along the length thereof and between said cable means and said liner member.

10. A control system comprising:
an outer conduit;
a liner disposed within said conduit, said liner being formed of a spiral wound strip having an overlapping edge to provide a helical ridge along the length thereof, the portions of said liner adjacent said ridge forming means for receiving bonding material;
bonding material disposed between said liner and said conduit and filling said bonding material receiving means to secure said liner to said conduit;
and a cable disposed within said liner member and shiftable relative thereto.

11. A control system comprising:
an outer conduit;
a liner member disposed within said conduit and formed of a spiral wound and overlapped tape, said overlap defining a helical ridge along the outer surface of said liner member to provide bonding material receiving means between said conduit and said liner member said overlap providing lubricant retaining means along the inner surface of said liner member;
bonding material disposed between said liner member and said conduit and in said bonding material receiving means to secure said liner member in said conduit;
and a cable disposed within said liner member and shiftable relative thereto, said lubricant retaining means in said liner member preventing the shifting of said cable from removing lubricant from said liner member.

References Cited

UNITED STATES PATENTS

| 3,093,162 | 6/1963 | Reiling | 156—294 X |
| 3,189,052 | 6/1965 | Devaney | 156—190 |
| 3,238,808 | 3/1966 | Barnard | 74—501 |

FOREIGN PATENTS

| 864,421 | 4/1961 | Great Britain. |

MILTON KAUFMAN, *Primary Examiner.*